US011030147B2

(12) United States Patent
Ginn et al.

(10) Patent No.: US 11,030,147 B2
(45) Date of Patent: Jun. 8, 2021

(54) HARDWARE ACCELERATION USING A SELF-PROGRAMMABLE COPROCESSOR ARCHITECTURE (71) Applicant: International Business Machines Corporation, Armonk, NY (US)

(72) Inventors: Justin Ginn, Austin, TX (US); Tony E. Sawan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 16/366,607

(22) Filed: Mar. 27, 2019

(65) Prior Publication Data
US 2020/0311022 A1    Oct. 1, 2020

(51) Int. Cl.
*G06F 15/78* (2006.01)
*G06F 9/30* (2018.01)
*G06F 15/82* (2006.01)
*G06F 12/0875* (2016.01)

(52) U.S. Cl.
CPC .......... *G06F 15/82* (2013.01); *G06F 9/30101* (2013.01); *G06F 12/0875* (2013.01); *G06F 15/7889* (2013.01); *G06F 2212/452* (2013.01)

(58) Field of Classification Search
CPC ............. G06F 15/7889; G06F 15/7867; G06F 15/7882; G06F 9/30101; G06F 9/3877; G06F 30/34
See application file for complete search history.

(56) References Cited

U.S. PATENT DOCUMENTS

| 5,748,979 | A  |   | 5/1998 | Trimberger |
| 5,752,035 | A  | * | 5/1998 | Trimberger ............. G06F 8/447 |
|           |    |   |        | 712/229 |
| 6,134,707 | A  |   | 10/2000 | Herrmann et al. |
| 6,421,817 | B1 |   | 7/2002 | Mohan et al. |
| 6,886,092 | B1 |   | 4/2005 | Douglass et al. |
| 6,901,502 | B2 |   | 5/2005 | Yano et al. |
| 6,954,845 | B2 |   | 10/2005 | Arnold et al. |
| 8,024,548 | B2 |   | 9/2011 | Daffron |
| 8,429,379 | B2 |   | 4/2013 | Daffron |
| 9,811,335 | B1 |   | 11/2017 | Khainovski et al. |

(Continued)

OTHER PUBLICATIONS

Chen et al., *A Just-in-Time Customizable Processor*, International Conference on Computer-Aided Design (ICCAD), Nov. 18-21, 2013, 8 pages, IEEE Xplore Digital Library (online), DOI: 10.1109/ICCAD.2013.6691166.

(Continued)

*Primary Examiner* — Aimee Li
*Assistant Examiner* — Courtney P Carmichael-Moody
(74) *Attorney, Agent, or Firm* — Teddi Maranzano (57) ABSTRACT

Hardware acceleration using a self-programmable coprocessor architecture may include determining that an instruction cache comprises an accelerable instruction sequence; instead of executing the accelerable instruction sequence, providing, to an accelerator block of an accelerator complex comprising a plurality of accelerator blocks, a complex instruction corresponding to the accelerable instruction sequence, wherein the accelerator block comprises one or more reprogrammable logic elements configured to execute the complex instruction; and receiving, from the accelerator complex, a result of the complex instruction.

20 Claims, 8 Drawing Sheets

(56) References Cited

U.S. PATENT DOCUMENTS

| | | | |
|---|---|---|---|
| 2008/0094102 A1 | 4/2008 | Osann | |
| 2009/0031111 A1* | 1/2009 | Chou | G06F 9/3836 |
| | | | 712/207 |
| 2009/0055596 A1 | 2/2009 | Wallach et al. | |
| 2009/0198978 A1* | 8/2009 | Greenhalgh | G06F 9/3808 |
| | | | 712/226 |
| 2011/0246691 A1 | 10/2011 | Stillwell, Jr. et al. | |
| 2014/0380025 A1* | 12/2014 | Kruglick | G06F 9/30007 |
| | | | 712/220 |

OTHER PUBLICATIONS

Clark et al., *Processor Acceleration Through Automated Instruction Set Customization*, Proceedings of the 36th Annual IEEE/ACM International Symposium on Microarchitecture (MICRO-36), Dec. 2003, pp. 129-140, IEEE Xplore Digital Library (online), DOI: 10.1109/MICRO.2003.1253189.

Koeplinger et al., *Automatic Generation of Efficient Accelerators for Reconfigurable Hardware*, 2016 ACM/IEEE 43rd Annual International Symposium on Computer Architecture (ISCA), Jun. 2016, 13 pages, IEEE Xplore Digital Library (online), DOI: 10.1109/ISCA.2016.20.

\* cited by examiner

HARDWARE ACCELERATION USING A SELF-PROGRAMMABLE COPROCESSOR ARCHITECTURE

BACKGROUND

Field of the Invention

The field of the invention is data processing, or, more specifically, methods, apparatus, and products for hardware acceleration using a self-programmable coprocessor architecture.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Hardware acceleration offers significant increases in compute speed and efficiency compared to the traditional microprocessor. Reprogrammable devices such as FPGAs (Fast-Programmable Gate Arrays) promise the benefits of hardware acceleration without the prohibitive costs of hardware design can additionally facilitate flexibility in the use of accelerator resources. Where these technologies fall short, however is their difficulty to develop software for and lack of flexibility across a range of software applications.

SUMMARY

Hardware acceleration using a self-programmable coprocessor architecture may include determining that an instruction cache includes an accelerable instruction sequence; determining that an accelerator complex comprises an accelerator block configured to execute a complex instruction corresponding to the accelerable instruction sequence; instead of executing the accelerable instruction sequence, providing the complex instruction to the accelerator complex; and receiving, from the accelerator complex, a result of the complex instruction.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
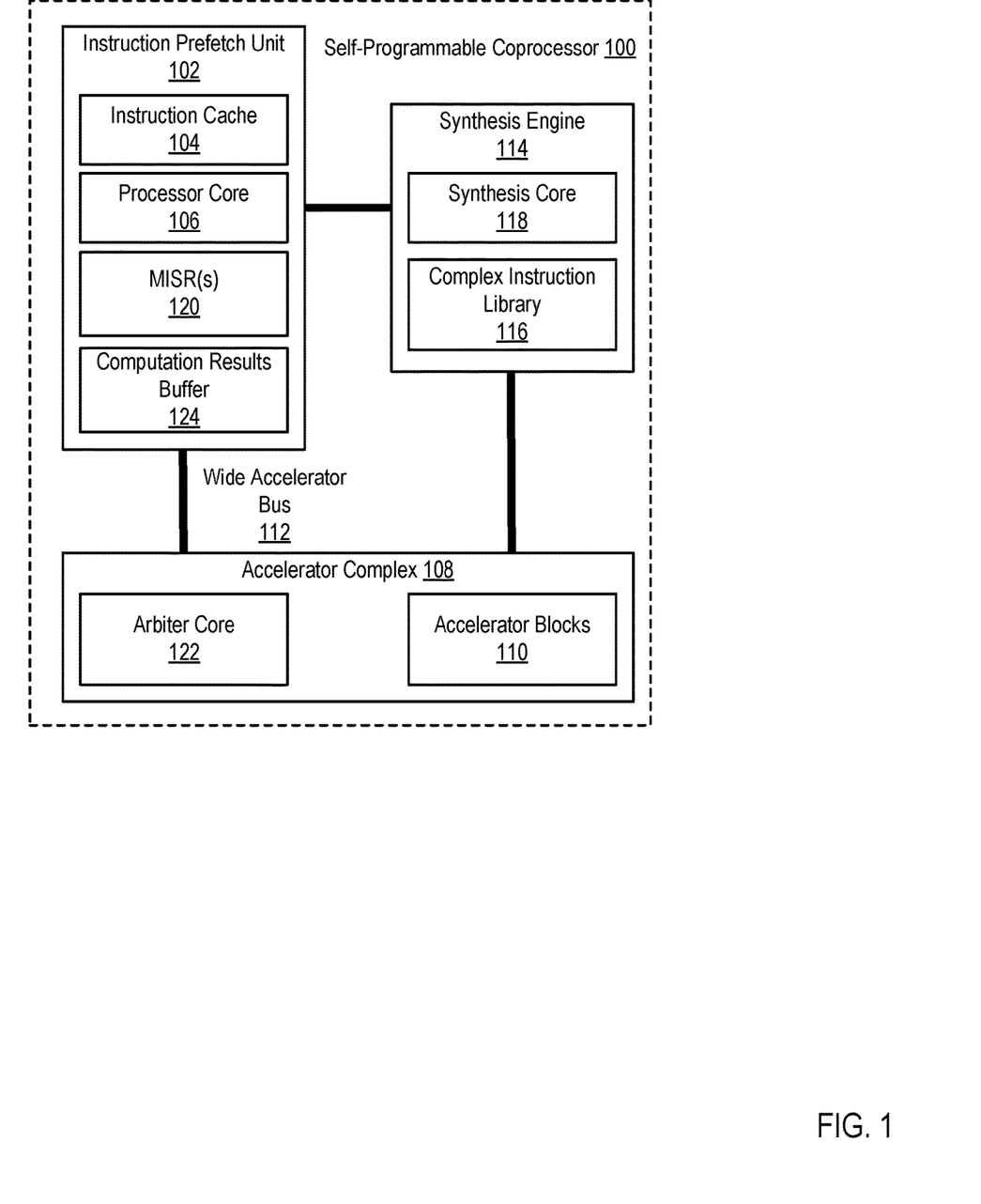
FIG. 1 is a block diagram of a self-programmable coprocessor architecture for hardware acceleration using a self-programmable coprocessor architecture.

Exemplary methods, apparatus, and products for hardware acceleration using a self-programmable coprocessor architecture in accordance with the present invention are described with reference to the accompanying drawings, beginning with FIG. 1. FIG. 1 sets forth a block diagram of a self-programmable coprocessor configured for hardware acceleration using a self-programmable coprocessor architecture. The self-programmable coprocessor (SPC) 100 of FIG. 1 includes an instruction prefetch unit 102 is configured to fetch instructions from memory (e.g., processor cache, Random Access Memory, disk memory) and store the fetched instructions in an instruction cache 104.

The instruction prefetch unit 102 may be coupled to an accelerator complex 108. The accelerator complex 108 is a collection of accelerator blocks 110. Each accelerator block may comprise reprogrammable logic elements (e.g., Fast-Programmable Gate Arrays (FPGAs), Programmable Logic Devices (PLDs)) that may each be configured to execute a particular complex instruction (e.g., an instruction that is functionally equivalent to an accelerable instruction sequence) using hardware acceleration. Accordingly, each accelerator block 110 may be configured according to an accelerator image comprising a configuration of an accelerator block for executing a particular complex instruction.

The instruction prefetch unit 102 and accelerator complex 108 may be in communication via a wide accelerator bus (WAB) 112. Particularly, the processor core 106 of the instruction prefetch unit 102 may provide, via the WAB 112, complex instructions to a particular accelerator block 110 of the accelerator complex 108 and receive, via the WAB 112, the result of the complex instruction.

The instruction prefetch unit 102 and accelerator complex 108 may each be in communication with a synthesis engine 114. The synthesis engine 114 is a microcontroller system configured to generate accelerator images for accelerable instruction sequences. In other words, the synthesis engine 114 is configured to generate, for a given accelerable instruction sequence, an accelerator image that, when applied to an accelerator block 110, allows for the execution, via the accelerator block 110, of a complex instruction corresponding to the given accelerable instruction sequence.

The synthesis engine 114 comprises a complex instruction library 116 configured to store accelerator images in association with (e.g., indexed by) their corresponding complex instructions. For example, the complex instruction library 116 may index accelerator images based on an opcode of the corresponding complex instruction. The synthesis engine 114 may be configured to load accelerator images from the complex instruction library 116, or generate accelerator images, and provide the accelerator images to the accelerator complex 108 for configuring a particular accelerator block 110. Functionality of the synthesis engine 114 may be facilitated by a synthesis core 118, a processor core dedicated or allocated to the synthesis engine 114. Although the complex instruction library 116 is shown as disposed within the synthesis engine 114, it is understood that the complex instruction library 116 may instead be disposed within the instruction prefetch unit 102 and accessible by the synthesis engine 114 via the WAB 112. Alternatively, a first instance of the complex instruction library 116 may be disposed within the synthesis engine 114 and a second instance of the complex instruction library 116 may be disposed in the instruction fetch unit 102. The second instance of the complex instruction library 116 disposed in the instruction fetch unit 102 may comprise a subset of entries of the first instance of the complex instruction library 116 may disposed within the synthesis engine 114. For example, the second instance of the complex instruction library 116 may store entries for complex instructions having a corresponding accelerator image deployed on the accelerator complex 108.

The instruction prefetch unit 102 is configured to determine that the instruction cache 104 comprises an accelerable instruction sequence. An accelerable instruction sequence is a series of instructions that repeat frequently during the execution of an application and may therefore benefit from hardware acceleration via the accelerator complex 108. Determining that the instruction cache comprises an accelerable instruction sequence may comprise determining if a signature of a subset of the instructions in the instruction cache corresponds to a complex instruction. Determining if a signature of a subset of the instructions in the instruction cache corresponds to a complex instruction may comprise determining, as the signature, an instruction address of a first instruction of the subset of the instructions.

Determining if a signature of a subset of the instructions in the instruction cache corresponds to a complex instruction may comprise determining, as the signature, a value of a multiple input signature register (MISR) 120. An MISR 120 is a register tapped to an instruction window (e.g., one or more sequential entries in the instruction queue), thereby generating a compressed value (e.g., a signature) based on each instruction in the instruction window. The instruction cache 104 may comprise a plurality of MISRs 120 each tapping a different instruction window. For example, each tapped instruction window could vary in size or number of taps, the particular addresses or indexes observed by the MISR 120, or in other ways.

Determining that the instruction cache 104 comprises an accelerable instruction sequence may then comprise determining if the signature (e.g., the instruction address or a value stored in a MISR 120) corresponds to a complex instruction for which acceleration is available. For example, the instruction prefetch unit 102 may maintain a data structure (e.g., a search tree, a list, a hash table) storing indexes (e.g., opcodes) of complex instructions. The data structure may store indexes of complex instructions for which the complex instruction library 116 stores a corresponding accelerator image. The data structure may also store indexes or other indications of complex instructions for which accelerator images are currently deployed on an accelerator block 110 (e.g., for which hardware acceleration is currently available). The data structure may comprise an instance of the complex instruction library 116 storing entries for complex instructions having a corresponding accelerator image deployed on the accelerator complex 108. The instruction prefetch unit 102 may then determine that the instruction cache 104 comprises an accelerable instruction sequence based on the signature matching an entry in the data structure.

The instruction prefetch unit 102 may then, instead of allowing the processor core to execute the accelerable instruction sequence, provide, to an accelerator block 110 of the accelerator complex 108, the complex instruction. The accelerator block 110 may be configured to execute the complex instruction. The complex instruction may comprise an opcode or branch instruction corresponding to or based on the signature (e.g., the MISR 120 value). The complex instruction may also comprise one or more inputs based on one or more inputs of the accelerable instruction sequence (e.g., target registers, source registers, predefined values). The instruction prefetch unit 102 may then provide the complex instruction via the WAB 112 to the accelerator complex 108 for execution via the corresponding accelerator block 110. The instruction prefetch unit 102 may then receive, from the accelerator complex 108, via the WAB 112, a result of the complex instruction.

The instruction prefetch unit 102 may also be configured to identify potentially accelerable instruction sequences (e.g., sequences of instructions that may benefit from hardware accelerator via the accelerator complex but for which an accelerator block 110 is not configured to execute a corresponding complex instruction). For example, a potentially accelerable instruction sequence may comprise an instruction sequence (e.g., corresponding to a complex instruction) having an accelerator image stored in the complex instruction library 116 but not deployed to an accelerator block 110. A potentially accelerable instruction sequence may also comprise an instruction sequence for which an accelerator image has not been generated.

For example, the instruction prefetch unit 102 may determine a signature of a potentially accelerable instruction sequence. For example, the instruction prefetch unit 102 may maintain a data structure indicating a frequency that a particular signature (e.g., instruction address or MISR 120) is encountered. In response to the frequency meeting a threshold (and/or in response to the signature not being included in a data structure indexing complex instructions for which accelerator images are deployed on the accelerator complex), the instruction prefetch unit 102 may generate a complex instruction for the potentially accelerable instruction sequence and provide the complex instruction to the synthesis engine 114.

In response to receiving the complex instruction, the synthesis engine 114 may determine if an entry corresponding to the complex instruction exists in the complex instruction library 116. For example, the synthesis engine 114 may determine if an entry indexed according to the opcode of the complex instruction exists in the complex instruction library 116. If an entry for the complex instruction exists in the complex instruction library 116, the synthesis engine 114 may provide the accelerator image of the entry to the accelerator complex 108.

If no entry for the complex instruction exists in the complex instruction library 116, the synthesis engine 114 may generate, based on the potentially accelerable instruction sequence, an accelerator image for the complex instruction. For example, the synthesis engine 114 may access the potentially accelerable instruction sequence from the instruction cache 104. Generating the accelerator image may comprise abstracting register targets and memory addresses referenced in the potentially accelerable instruction sequence. Generating the accelerator image may also comprise identifying instructions that write to a register or memory element that is subsequently read by another instruction in the potentially accelerable instruction sequence. These identified instructions may not be synthesized, but are instead replaced with direct connections between logic gates in the accelerator image.

Generating the accelerator image may also comprise identifying each register or memory address that serves as an input to an instruction in the potentially accelerable instruction sequence. The identified registers and memory addresses will comprise one or more inputs of the accelerator image. These identified registers and memory addresses may exclude those that are subsequently read by another instruction as set forth above.

Generating the accelerator image may also comprise identifying each register or memory address that serves as an output to an instruction in the potentially accelerable instruction sequence. The identified registers and memory addresses will comprise one or more outputs of the accelerator image. These identified registers and memory addresses may exclude those that are subsequently read by another instruction as set forth above.

Generating the accelerator image may also comprise identifying outputs to registers or memory addresses that are subsequently read by an instruction in the potentially accelerable instruction sequence. The identified registers and memory addresses will comprise one or more incidental outputs of the accelerator image. The accelerator complex 108 may be configured to preserve these incidental outputs in the event that another instruction depends on their value. Only a final write to an incidental output is implemented in an accelerator image.

Generating the accelerator image may further comprise converting the potentially accelerable instruction sequence into pseudocode in which the inputs, outputs, and incidental outputs are abstracted. Generating the accelerator image may further comprise comparing the generated pseudocode to pseudocode for other accelerator images in the complex instruction library 116. If a match is found, the potentially accelerable instruction sequence is functionally identical to an already identified accelerable instruction sequence and only differs in targeted registers or memory addresses. The complex instruction is mapped in the complex instruction library 116 to the accelerator image corresponding to the matching pseudocode as an alternate opcode and no generation of an accelerator image is required. Otherwise, the pseudocode is synthesized into an accelerator image (e.g., an FPGA image) as would be appreciated by one skilled in the art. In other words, the accelerator image is generated from the pseudocode. The generated accelerator image may then be stored as an entry in the complex instruction library 116 as mapped to the complex instruction. The generated accelerator image, or the accelerator image to which the complex instruction is additionally mapped, may then be provided to the accelerator complex.

In response to receiving the accelerator image 108, the accelerator complex 108 may determine whether to configure an accelerator block 110 based on the accelerator image 108. Determining whether to configure an accelerator block 110 based on the accelerator image 108 and the configuration of accelerator blocks 110 may be facilitated by arbiter logic executed by an arbiter core 122.

Determining whether to configure an accelerator block 110 based on the accelerator image may be based on a number of available (e.g., unconfigured) accelerator blocks.

Determining whether to configure an accelerator block 110 based on the accelerator image may be based on a frequency of accelerator block 110 access. For example, a configured accelerator block 110 may be reconfigured based on the received accelerator image in response to having a frequency of access or use falling below a threshold, or having a least frequent access relative to other accelerator blocks. Determining whether to configure an accelerator block 110 based on the accelerator image may be based on an estimated speedup provided by configuring the accelerator block 110. The estimated speedup may be based on a number of instructions accelerated by the accelerator image, a frequency of occurrence of the corresponding instruction sequence, or other factors.

Determining whether to configure an accelerator block 110 based on the accelerator image may be based on a verification of the accelerator image. For example, in parallel to the synthesis of the accelerator image and/or selection of an accelerator image from a complex instruction library 116 by the synthesis engine 114, the processor core 106 may execute the potentially accelerable instruction sequence and store the result of the potentially accelerable instruction sequence in a computation results buffer (CRB) 124. The accelerator complex 108 may access the CRB 124 via the WAB 112 and compare the results of executing the potentially accelerable instruction sequence to the output of the accelerator image. If the values match, the accelerator image may be considered verified.

In response to determining to configure an accelerator block 110 based on an accelerator image, the accelerator complex 108 may provide an indication to the instruction prefetch unit 102 and/or synthesis engine 114 that the accelerator image has been deployed, thereby indicating that subsequent occurrences of the potentially accelerable instruction sequence can be considered as accelerable instruction sequences. The instruction prefetch unit 102 and/or synthesis engine 114 may then update any relevant data structures to reflect the deployment of the accelerator image.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
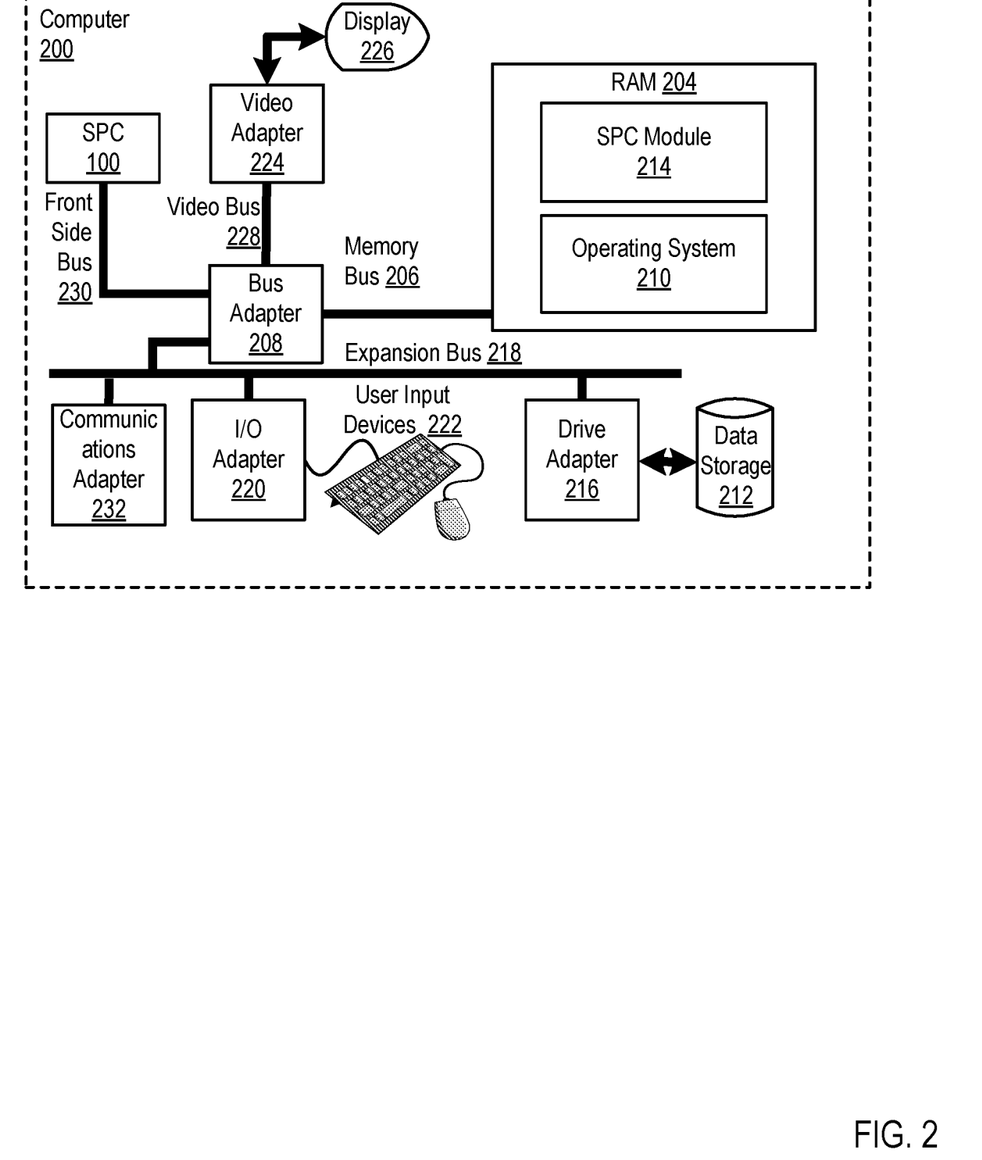
FIG. 2 is a block diagram of a computer configured for hardware acceleration using a self-programmable coprocessor architecture.

Hardware acceleration using a self-programmable coprocessor architecture in accordance with the present invention is generally implemented with computers, that is, with automated computing machinery. For further explanation, therefore, FIG. 2 sets forth a block diagram of automated computing machinery comprising an exemplary computer 200 configured for hardware acceleration using a self-programmable coprocessor architecture according to embodiments of the present invention. The computer 200 of FIG. 2 includes at least one self-programmable coprocessor (SPC) 100 as well as random access memory 204 ('RAM')

which is connected through a high speed memory bus 206 and bus adapter 208 to SPC 100 and to other components of the computer 200.

Stored in RAM 204 is an operating system 210. Operating systems useful in computers configured for hardware acceleration using a self-programmable coprocessor architecture according to embodiments of the present invention include UNIX™, Linux™, Microsoft Windows™, AIX™, IBM's i OS™, and others as will occur to those of skill in the art. The operating system 208 in the example of FIG. 2 is shown in RAM 204, but many components of such software typically are stored in non-volatile memory also, such as, for example, on data storage 212, such as a disk drive. Also stored in RAM is the support module 214 a module for hardware acceleration using a self-programmable coprocessor architecture according to embodiments of the present invention.

The computer 200 of FIG. 2 includes disk drive adapter 216 coupled through expansion bus 218 and bus adapter 208 to SPC 100 and other components of the computer 200. Disk drive adapter 216 connects non-volatile data storage to the computer 200 in the form of data storage 212. Disk drive adapters useful in computers configured for hardware acceleration using a self-programmable coprocessor architecture according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer 200 of FIG. 2 includes one or more input/output ('I/O') adapters 220. I/O adapters implement user-oriented input/output through, for example, software drivers and computer hardware for controlling output to display devices such as computer display screens, as well as user input from user input devices 222 such as keyboards and mice. The example computer 200 of FIG. 2 includes a video adapter 224, which is an example of an I/O adapter specially designed for graphic output to a display device 226 such as a display screen or computer monitor. Video adapter 224 is connected to SPC 100 through a high speed video bus 228, bus adapter 208, and the front side bus 230, which is also a high speed bus.

The exemplary computer 200 of FIG. 2 includes a communications adapter 232 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for hardware acceleration using a self-programmable coprocessor architecture according to embodiments of the present invention include modems for wired dial-up communications, Ethernet (IEEE 802.3) adapters for wired data communications, and 802.11 adapters for wireless data communications.

Figure 3:
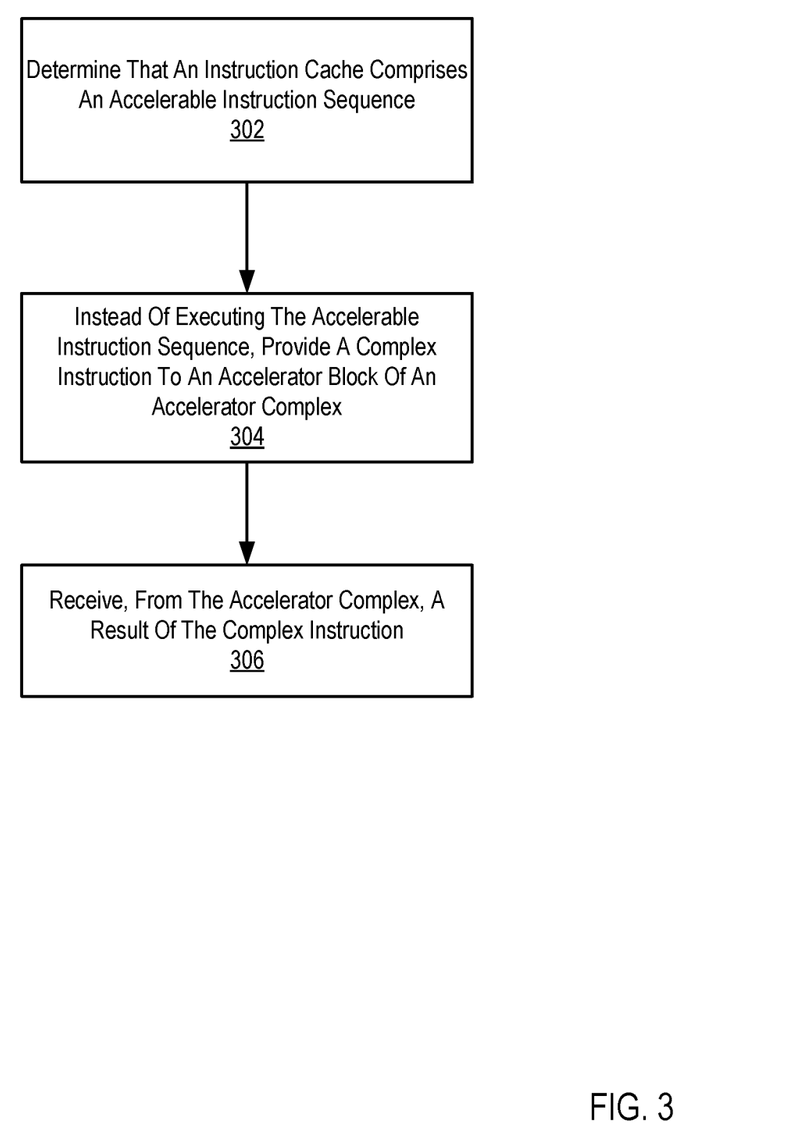
FIG. 3 is a flowchart of an example method for hardware acceleration using a self-programmable coprocessor architecture.

For further explanation, FIG. 3 sets forth a flow chart illustrating an exemplary method for hardware acceleration using a self-programmable coprocessor architecture according to embodiments of the present invention that includes determining 302 (e.g., by an instruction prefetch unit 102) that an instruction cache 104 comprises an accelerable instruction sequence. An accelerable instruction sequence is a series of instructions that repeat frequently during the execution of an application, and may therefore benefit from hardware acceleration via the accelerator complex 108. Determining that the instruction cache comprises an accelerable instruction sequence may comprise determining if a signature of a subset of the instructions in the instruction cache corresponds to a complex instruction. Determining if a signature of a subset of the instructions in the instruction cache corresponds to a complex instruction may comprise determining, as the signature, an instruction address of a first instruction of the subset of the instructions.

Determining that the instruction cache 104 comprises an accelerable instruction sequence may then comprise determining if the signature (e.g., the instruction address or a value stored in a MISR 120) corresponds to a complex instruction. For example, a data structure (e.g., a search tree, a list, a hash table) storing indexes (e.g., opcodes) of complex instructions may be maintained (e.g., by the instruction prefetch unit 102). The data structure may store indexes of complex instructions for which a complex instruction library 116 stores a corresponding accelerator image. The data structure may also store indexes or other indications of complex instructions for which accelerator images are currently deployed on an accelerator block 110 (e.g., for which hardware acceleration is currently available). The instruction prefetch unit 102 may then determine that the instruction cache 104 comprises an accelerable instruction sequence based on the signature matching an entry in the data structure.

The method of FIG. 3 further comprises providing 304 (e.g., by the instruction fetch unit 102), instead of executing the accelerable instruction sequence (e.g., by a processor core 106), to an accelerator block 110 of the accelerator complex 108, the complex instruction. The accelerator block 110 may be configured to execute the complex instruction. The complex instruction may comprise an opcode or branch instruction corresponding to or based on the signature (e.g., the MISR 120 value). The complex instruction may also comprise one or more inputs based on one or more inputs of the accelerable instruction sequence (e.g., target registers, source registers, predefined values). Providing the complex instruction may comprise providing the complex instruction via a WAB 112 to the accelerator complex 108 for execution via the corresponding accelerator block 110. The method of FIG. 3 further comprises receiving 306 (e.g., by the instruction fetch unit 102, via the WAB 112), from the accelerator complex 108, a result of the complex instruction.

Figure 4:
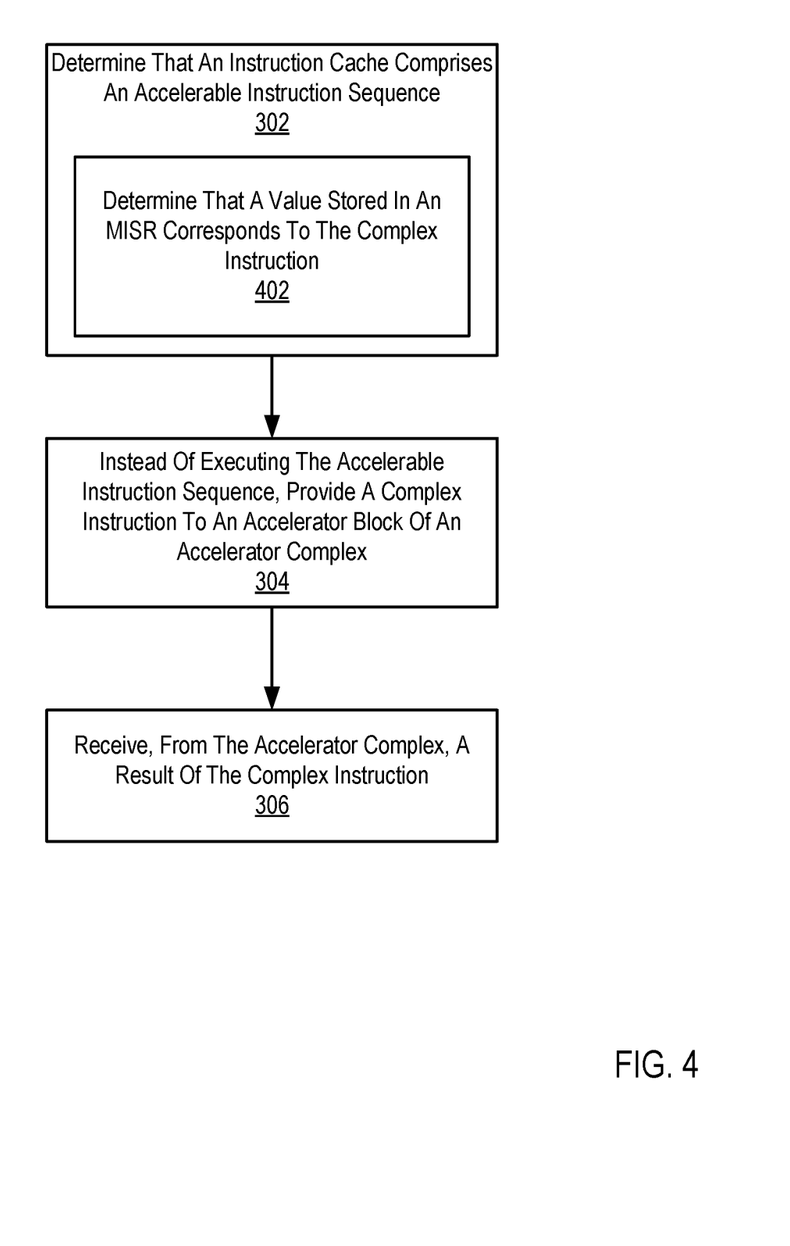
FIG. 4 is a flowchart of an example method for hardware acceleration using a self-programmable coprocessor architecture.

For further explanation, FIG. 4 sets forth a flow chart illustrating an exemplary method for hardware acceleration using a self-programmable coprocessor architecture according to embodiments of the present invention that includes determining 302 that an instruction cache comprises an accelerable instruction sequence; providing 304, instead of executing the accelerable instruction sequence, a complex instruction to an accelerator block of an accelerator complex; and receiving 306, from the accelerator complex, a result of the complex instruction.

FIG. 4 differs from FIG. 3 in that determining 302 that the instruction cache comprises an accelerable instruction sequence comprises determining 402 that a value stored in a MISR 120 corresponds to the complex instruction. An MISR 120 is a register tapped to an instruction window (e.g., one or more sequential entries in the instruction queue), thereby generating a compressed value (e.g., a signature)

based on each instruction in the instruction window. The instruction cache 104 may comprise a plurality of MISRs 120 each tapping a different instruction window. For example, each tapped instruction window could vary in size or number of tapped instructions, the particular addresses or indexes tapped by the MISR 120, or in other ways. The values stored in each MISR 120 can then be considered a signature of an instruction sequence provided as input to the respective MISR 120/Thus, determining 402 that a value stored in a MISR 120 corresponds to the complex instruction may comprise determining that the value stored in the MISR 120 corresponds to a data structure entry or other indication that an accelerator block 110 of the accelerator block 108 is configured to execute the complex instruction.

Figure 5:
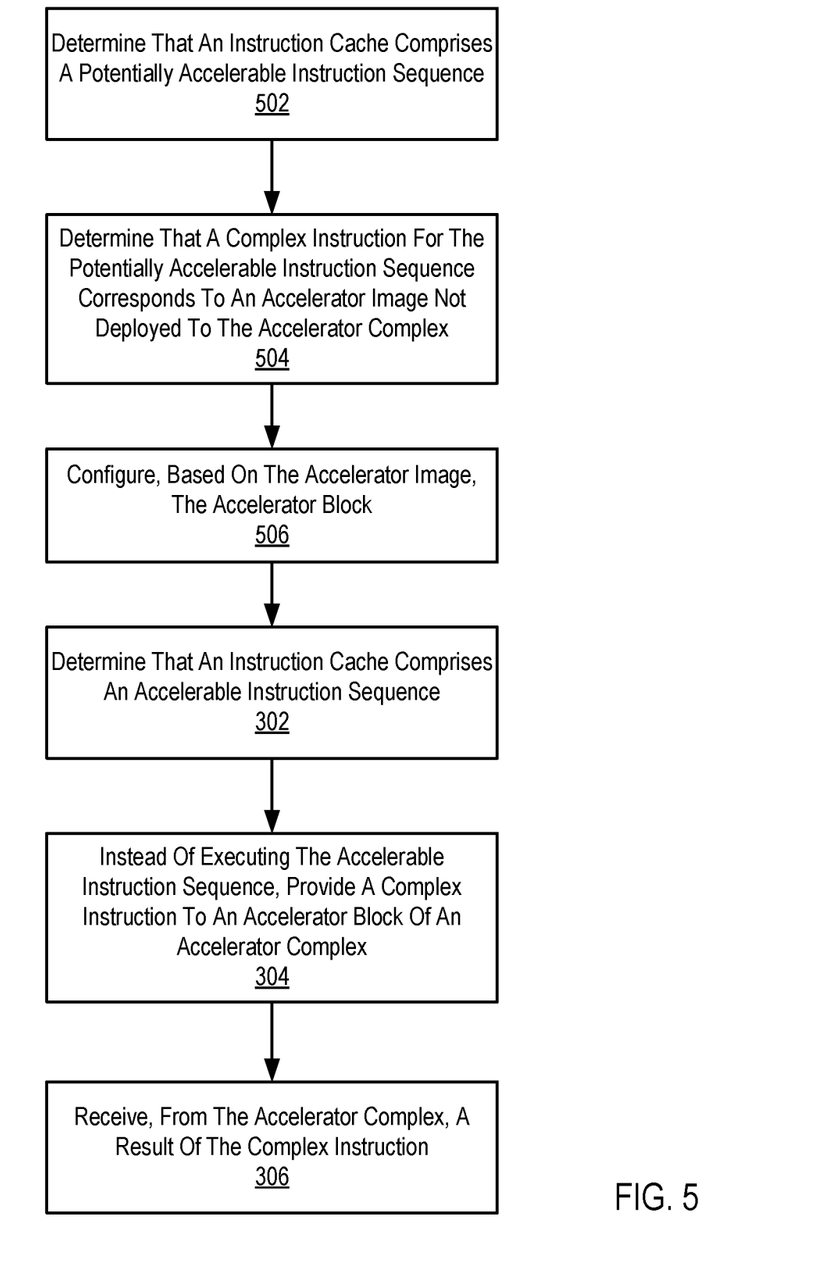
FIG. 5 is a flowchart of an example method for hardware acceleration using a self-programmable coprocessor architecture.

For further explanation, FIG. 5 sets forth a flow chart illustrating an exemplary method for hardware acceleration using a self-programmable coprocessor architecture according to embodiments of the present invention that includes determining 302 that an instruction cache comprises an accelerable instruction sequence; providing 304, instead of executing the accelerable instruction sequence, a complex instruction to an accelerator block of an accelerator complex; and receiving 306, from the accelerator complex, a result of the complex instruction.

FIG. 5 differs from FIG. 3 in that the method of FIG. 5 further comprises determining 502 (e.g., by the instruction prefetch unit 102) that the instruction cache 104 comprises a potentially accelerable instruction sequence. The potentially accelerable instruction sequence may comprise an instruction sequence (e.g., corresponding to a complex instruction) having an accelerator image stored in the complex instruction library 116 but not deployed to an accelerator block 110.

For example, the instruction prefetch unit 102 may determine a signature of a potentially accelerable instruction sequence. For example, the instruction prefetch unit 102 may maintain a data structure indicating a frequency that a particular signature (e.g., instruction address or MISR 120) is encountered. In response to the frequency meeting a threshold (and/or in response to the signature not being included in a data structure indexing complex instructions for which accelerator images are deployed on the accelerator complex), the instruction prefetch unit 102 may generate a complex instruction for the potentially accelerable instruction sequence and provide the complex instruction to the synthesis engine 114.

The method of FIG. 5 further comprises determining 504 (e.g., by a synthesis engine 114) that the complex instruction for the potentially accelerable instruction sequence corresponds to an accelerator image not deployed to the accelerator complex 108. For example, the synthesis engine 114 if an entry corresponding to the complex instruction for the potentially accelerable instruction sequence exists in the complex instruction library 116. The synthesis engine 114 may determine if an entry indexed according to the opcode of the complex instruction exists in the complex instruction library 116. If an entry for the complex instruction exists in the complex instruction library 116, the synthesis engine 114 may provide the accelerator image of the entry to the accelerator complex 108.

The method of FIG. 5 further comprises configuring, based on the accelerator image, an accelerator block 108 of the accelerator complex 110. For example, the accelerator complex 110 may configure the accelerator block 108 (e.g., reprogrammable logic portions of a PLD or FPGA fabric) based on the configuration indicated in the accelerator image. Thus, subsequent occurrences of the potentially accelerable instruction sequence may be treated as an accelerable instruction sequence. For example, the accelerable instruction sequence in determining 302 that the instruction cache 104 comprises an accelerable instruction sequence may match the potentially accelerable instruction sequence described above. As an accelerator block 108 has been configured to execute a complex instruction corresponding to this instruction sequence, the complex instruction may then be executed by the accelerator complex 110 instead of the instruction sequence being executed by the processor core 106.

For further explanation, FIG. 5 sets forth a flow chart illustrating an exemplary method for hardware acceleration using a self-programmable coprocessor architecture according to embodiments of the present invention that includes determining 302 that an instruction cache comprises an accelerable instruction sequence; providing 304, instead of executing the accelerable instruction sequence, a complex instruction to an accelerator block of an accelerator complex; and receiving 306, from the accelerator complex, a result of the complex instruction.

Figure 6:
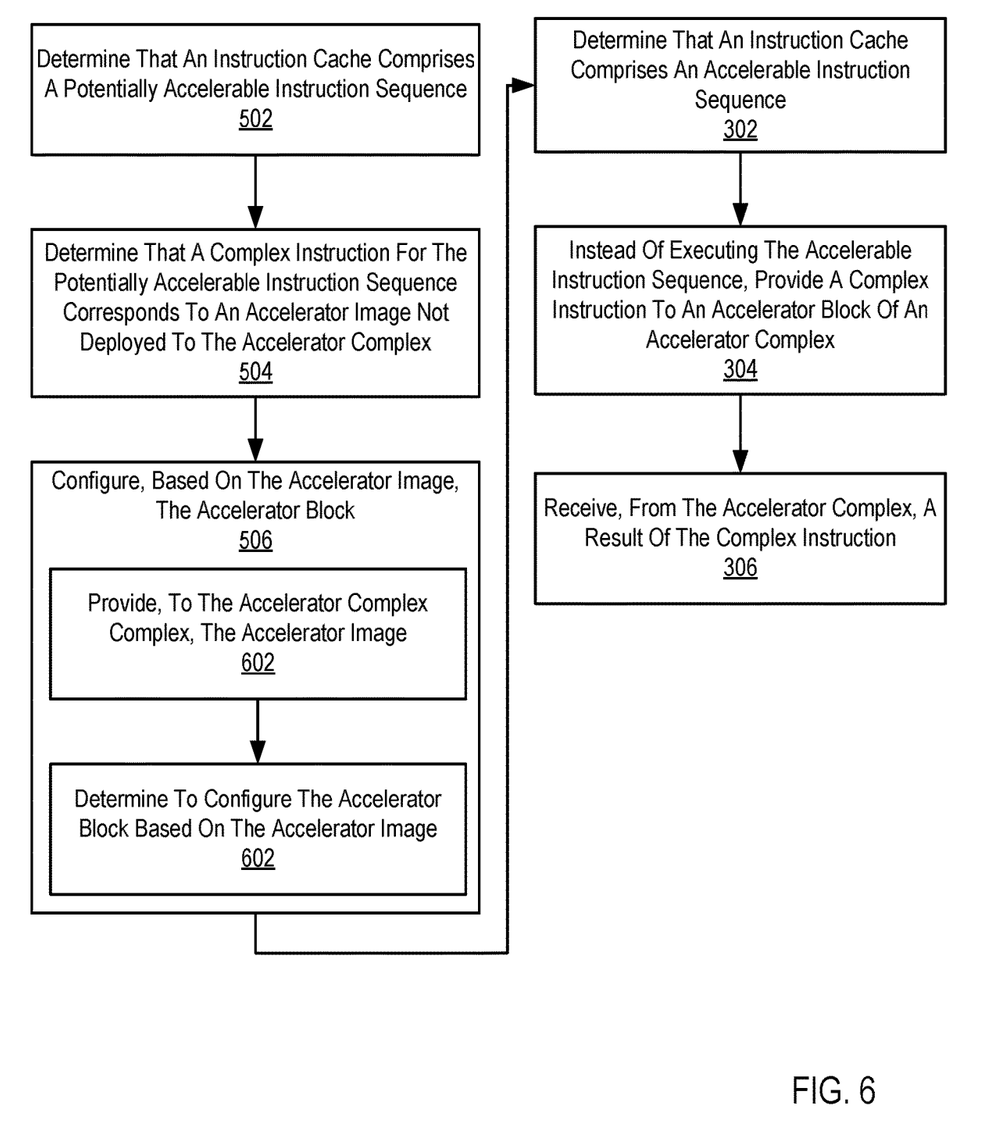
FIG. 6 is a flowchart of an example method for hardware acceleration using a self-programmable coprocessor architecture.

FIG. 6 differs from FIG. 5 in that configuring 506, based on the accelerator image, the accelerator block 108 comprises providing 602 (e.g., by the synthesis engine 114), to the accelerator complex 110, the accelerator image. For example, the synthesis engine 114 may load, from a complex instruction library 116, an accelerator image corresponding to a received complex instruction for a potentially accelerable instruction sequence. The synthesis engine 114 may then provide the loaded accelerator image to the accelerator complex 110.

FIG. 6 further differs from FIG. 5 in that configuring 506, based on the accelerator image, the accelerator block 108 further comprises determining 602 (e.g., by the accelerator complex) to configure the accelerator block 108 based on the accelerator image. Determining whether to configure an accelerator block 110 based on the accelerator image 108 and the configuration of accelerator blocks 110 may be facilitated by arbiter logic executed by an arbiter core 122.

Determining whether to configure an accelerator block 110 based on the accelerator image may be based on a number of available (e.g., unconfigured) accelerator blocks. Determining whether to configure an accelerator block 110 based on the accelerator image may be based on a frequency of accelerator block 110 access. For example, a configured accelerator block 110 may be reconfigured based on the received accelerator image in response to having a frequency of access or use falling below a threshold or having a least frequent access relative to other accelerator blocks. Determining whether to configure an accelerator block 110 based on the accelerator image may be based on an estimated speedup provided by configuring the accelerator block 110. The estimated speedup may be based on a number of instructions accelerated by the accelerator image, a frequency of occurrence of the corresponding instruction sequence, or other factors.

Determining to configure an accelerator block 110 based on the accelerator image may be based on a verification of the accelerator image. For example, in parallel to the synthesis of the accelerator image and/or selection of an accelerator image from a complex instruction library 116 by the synthesis engine 114, the processor core 106 may execute the potentially accelerable instruction sequence and store the result of the potentially accelerable instruction sequence in a computation results buffer (CRB) 124. The accelerator complex 108 may access the CRB 124 via the WAB 112 and compare the results of executing the potentially accelerable instruction sequence to the output of the accelerator image. If the values match, the accelerator image may be considered verified.

The accelerator complex 108 may also provide an indication to the instruction prefetch unit 102 and/or synthesis engine 114 that the accelerator image has been deployed, thereby indicating that subsequent occurrences of the potentially accelerable instruction sequence can be considered as accelerable instruction sequences. The instruction prefetch unit 102 and/or synthesis engine 114 may then update any relevant data structures to reflect the deployment of the accelerator image.

Figure 7:
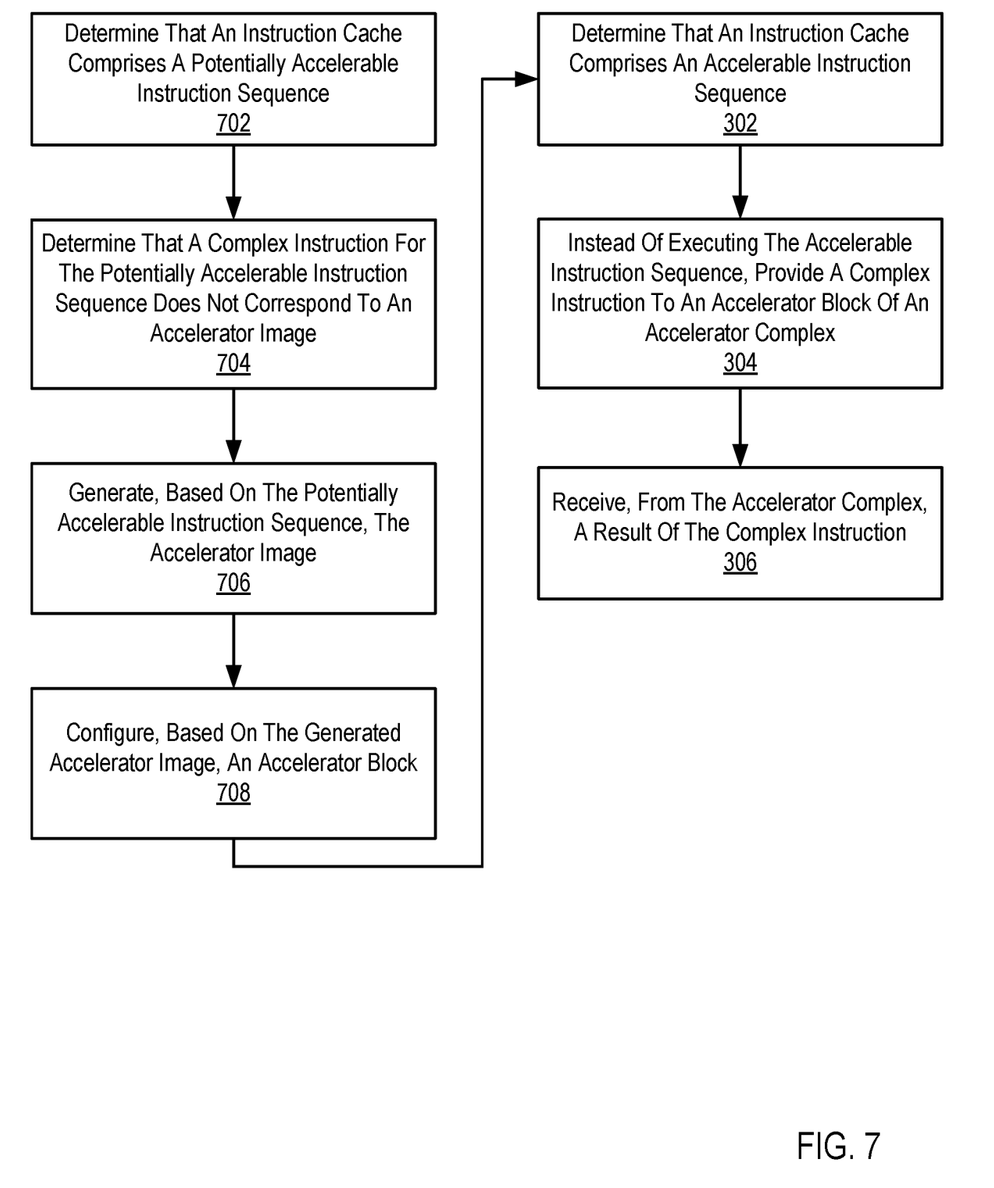
FIG. 7 is a flowchart of an example method for hardware acceleration using a self-programmable coprocessor architecture.

For further explanation, FIG. 7 sets forth a flow chart illustrating an exemplary method for hardware acceleration using a self-programmable coprocessor architecture according to embodiments of the present invention that includes determining 302 that an instruction cache comprises an accelerable instruction sequence; providing 304, instead of executing the accelerable instruction sequence, a complex instruction to an accelerator block of an accelerator complex; and receiving 306, from the accelerator complex, a result of the complex instruction.

FIG. 7 differs from FIG. 3 in that the method of FIG. 7 further comprises determining 702 (e.g., by the instruction fetch unit 102) that the instruction cache 104 comprises a potentially accelerable instruction sequence. The potentially accelerable instruction sequence may comprise an instruction sequence (e.g., corresponding to a complex instruction) having an accelerator image stored in the complex instruction library 116 but not deployed to an accelerator block 110.

For example, the instruction prefetch unit 102 may determine a signature of a potentially accelerable instruction sequence. For example, the instruction prefetch unit 102 may maintain a data structure indicating a frequency that a particular signature (e.g., instruction address or MISR 120) is encountered. In response to the frequency meeting a threshold (and/or in response to the signature not being included in a data structure indexing complex instructions for which accelerator images are deployed on the accelerator complex), the instruction prefetch unit 102 may generate a complex instruction for the potentially accelerable instruction sequence and provide the complex instruction to the synthesis engine 114.

The method of FIG. 7 further comprises determining 704 (e.g., by a synthesis engine 114) that the complex instruction for the potentially accelerable instruction sequence does not correspond to an accelerator image (e.g., does not correspond to an entry in the complex instruction library 116). The method of FIG. 7 further comprises generating 706 (e.g., by the synthesis engine 114), based on the potentially accelerable instruction sequence, an accelerator image corresponding to the complex instruction for the potentially accelerable instruction sequence.

The synthesis engine 114 may access the potentially accelerable instruction sequence from the instruction cache 104. Generating the accelerator image may comprise abstracting register targets and memory addresses referenced in the potentially accelerable instruction sequence. Generating the accelerator image may also comprise identifying instructions that write to a register or memory element that is subsequently read by another instruction in the potentially accelerable instruction sequence. These identified instructions may not be synthesized, but are instead replaced with direct connections between logic gates in the accelerator image.

Generating the accelerator image may also comprise identifying each register or memory address that serves as an input to an instruction in the potentially accelerable instruction sequence. The identified registers and memory addresses will comprise one or more inputs of the accelerator image. These identified registers and memory addresses may exclude those that are subsequently read by another instruction as set forth above.

Generating the accelerator image may also comprise identifying each register or memory address that serves as an output to an instruction in the potentially accelerable instruction sequence. The identified registers and memory addresses will comprise one or more outputs of the accelerator image. These identified registers and memory addresses may exclude those that are subsequently read by another instruction as set forth above.

Generating the accelerator image may also comprise identifying outputs to registers or memory addresses that are subsequently read by an instruction in the potentially accelerable instruction sequence. The identified registers and memory addresses will comprise one or more incidental outputs of the accelerator image. The accelerator complex 108 may be configured to preserve these incidental outputs in the event that another instruction depends on their value. Only a final write to an incidental output is implemented in an accelerator image.

Generating the accelerator image may further comprise converting the potentially accelerable instruction sequence into pseudocode in which the inputs, outputs, and incidental outputs are abstracted. Generating the accelerator image may further comprise comparing the generated pseudocode to pseudocode for other accelerator images in the complex instruction library 116. If a match is found, the potentially accelerable instruction sequence is functionally identical to an already identified accelerable instruction sequence and only differs in targeted registers or memory addresses. The complex instruction is mapped in the complex instruction library 116 to the accelerator image corresponding to the matching pseudocode as an alternate opcode and no generation of an accelerator image is required. Otherwise, the pseudocode is synthesized into an accelerator image (e.g., the accelerator image is generated) as would be appreciated by one skilled in the art. The generated accelerator image may then be stored as an entry in the complex instruction library 116 as mapped to the complex instruction. The generated accelerator image, or the accelerator image to which the complex instruction is additionally mapped, may then be provided to the accelerator complex.

The method of FIG. 7 further comprises configuring, based on the generated accelerator image, an accelerator block 108 of the accelerator complex 110. For example, the accelerator complex 110 may configure the accelerator block 108 (e.g., reprogrammable logic portions of a PLD or FPGA fabric) based on the configuration indicated in the accelerator image. Thus, subsequent occurrences of the potentially accelerable instruction sequence may be treated as an accelerable instruction sequence. For example, the accelerable instruction sequence in determining 302 that the instruction cache 104 comprises an accelerable instruction sequence may match the potentially accelerable instruction sequence described above. As an accelerator block 108 has been configured to execute a complex instruction corresponding to this instruction sequence, the complex instruction may then be executed by the accelerator complex 110 instead of the instruction sequence being executed by the processor core 106.

Figure 8:
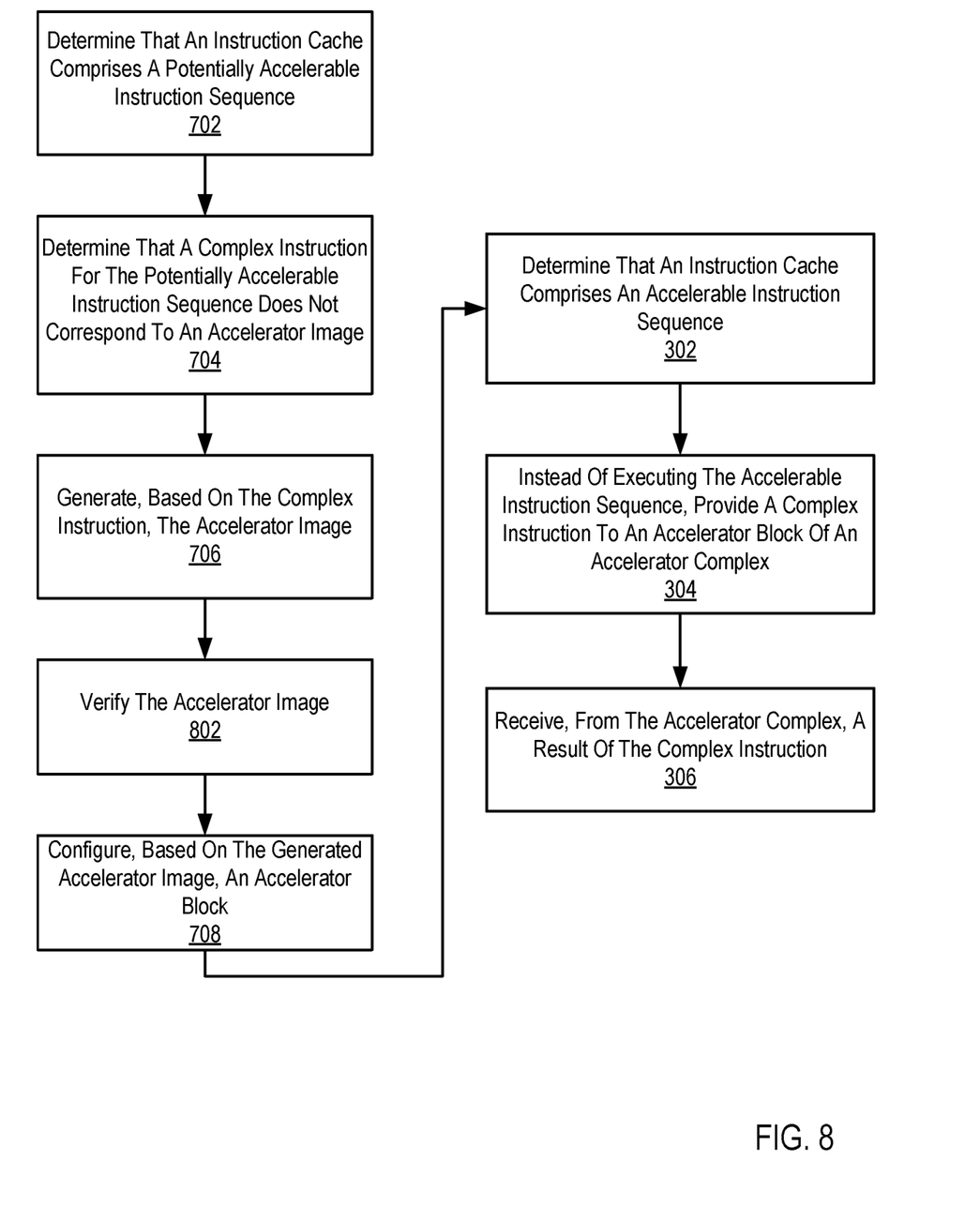
FIG. 8 is a flowchart of an example method for hardware acceleration using a self-programmable coprocessor architecture.

For further explanation, FIG. 8 sets forth a flow chart illustrating an exemplary method for hardware acceleration using a self-programmable coprocessor architecture according to embodiments of the present invention that includes determining 702 that an instruction cache comprises a potentially accelerable instruction sequence; determining 704 that a complex instruction for the potentially accelerable instruction sequence does not correspond to an accelerator image; generating 706, based on the potentially accelerable instruction sequence, the accelerator image; configuring 708, based on the generated accelerator image, an accelerator block; determining 302 that an instruction cache comprises an accelerable instruction sequence; providing 304, instead of executing the accelerable instruction sequence, a complex instruction to an accelerator block of an accelerator complex; and receiving 306, from the accelerator complex, a result of the complex instruction.

FIG. 8 differs from FIG. 7 in that the method of FIG. 8 further comprises verifying 802 the accelerator image. For example, in parallel to generating 706 the accelerator image, the processor core 106 may execute the potentially accelerable instruction sequence and store the result of the potentially accelerable instruction sequence in a computation results buffer (CRB) 124. The accelerator complex 108 may access the CRB 124 via the WAB 112 and compare the results of executing the potentially accelerable instruction sequence to the output of the accelerator image. If the values match, the accelerator image may be considered verified.

In view of the explanations set forth above, readers will recognize that the benefits of hardware acceleration using a self-programmable coprocessor architecture according to embodiments of the present invention include:

- Identifying accelerable instruction sequences during execution, alleviating the need for code to be written and/or precompiled with particular accelerator configurations in mind.
- Accelerator images can be dynamically generated and deployed during runtime.

Exemplary embodiments of the present invention are described largely in the context of a fully functional computer system for hardware acceleration using a self-programmable coprocessor architecture. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for hardware acceleration using a self-programmable coprocessor architecture, the method comprising:

determining that an instruction cache comprises either an accelerable instruction sequence or a potentially accelerable instruction sequence;

responsive to determining that the instruction cache comprises an accelerable instruction sequence:
instead of executing, by a processor core, the accelerable instruction sequence, providing, to an accelerator block of an accelerator complex comprising a plurality of accelerator blocks, a complex instruction corresponding to the accelerable instruction sequence, wherein the accelerator block comprises one or more reprogrammable logic elements configured to execute the complex instruction; and
receiving, from the accelerator complex, a result of the complex instruction;

responsive to determining that the instruction cache comprises the potentially accelerable instruction sequence:
determining that another complex instruction for the potentially accelerable instruction sequence does not correspond to any accelerator image; and
synthesizing, based on the potentially accelerable instruction sequence, a accelerator image in parallel to executing, by the processor core, the potentially accelerable instruction sequence.

2. The method of claim 1, wherein determining that the instruction cache comprises an accelerable instruction sequence comprises determining that a value stored in a Multiple Input Signature Register (MISR) corresponds to the complex instruction, wherein the MISR is configured to receive, as input, a plurality of instructions from the instruction cache.

3. The method of claim 1, further comprising:
determining that the instruction cache comprises the potentially accelerable instruction sequence;
determining that the other complex instruction for the potentially accelerable instruction sequence corresponds to an accelerator image not deployed to the accelerator complex; and
configuring, based on the accelerator image not deployed to the accelerator complex, the accelerator block of the reprogrammable accelerator to execute the other complex instruction.

4. The method of claim 3, wherein configuring, based on the accelerator image not deployed to the accelerator complex, the accelerator block of the reprogrammable accelerator to execute the other complex instruction comprises providing, to the accelerator complex, the accelerator image not deployed to the accelerator complex.

5. The method of claim 4, further comprising determining to configure, based on the accelerator image not deployed to the accelerator complex, the accelerator block based on one or more of: a number of available accelerator blocks, a frequency of accelerator block access, a verification of the accelerator image not deployed to the accelerator complex, or an estimated speedup.

6. The method of claim 1, further comprising verifying the synthesized accelerator image including comparing results of executing the potentially accelerable instruction sequence by the processor core with an output of the synthesized accelerator image.

7. The method of claim 6, further comprising storing the synthesized accelerator image in a Complex Instruction Library comprising one or more entries each associating one of a plurality of complex instructions with a corresponding accelerator image.

8. An apparatus for hardware acceleration using a self-programmable coprocessor architecture configured to carry out the steps of:

determining that an instruction cache comprises either an accelerable instruction sequence or a potentially accelerable instruction sequence;

responsive to determining that the instruction cache comprises an accelerable instruction sequence:

instead of executing, by a processor core, the accelerable instruction sequence, providing, to an accelerator block of an accelerator complex comprising a plurality of accelerator blocks, a complex instruction corresponding to the accelerable instruction sequence, wherein the accelerator block comprises one or more reprogrammable logic elements configured to execute the complex instruction; and receiving, from the accelerator complex, a result of the complex instruction;

responsive to determining that the instruction cache comprises the potentially accelerable instruction sequence:

determining that another complex instruction for the potentially accelerable instruction sequence does not correspond to any accelerator image; and synthesizing, based on the potentially accelerable instruction sequence, a accelerator image in parallel to executing, by the processor core, the potentially accelerable instruction sequence.

9. The apparatus of claim 8, wherein determining that the instruction cache comprises an accelerable instruction sequence comprises determining that a signature generated by a Multiple Input Signature Register (MISR) corresponds to the complex instruction, wherein the MISR is configured to receive, as input, a plurality of instructions from the instruction cache.

10. The apparatus of claim 8, wherein the steps further comprise:

determining that the instruction cache comprises the potentially accelerable instruction sequence;

determining that the other complex instruction for the potentially accelerable instruction sequence corresponds to an accelerator image not deployed to the accelerator complex; and configuring, based on the accelerator image not deployed to the accelerator complex, the accelerator block of the reprogrammable accelerator to execute the other complex instruction.

11. The apparatus of claim 10, wherein configuring, based on the accelerator image not deployed to the accelerator complex, the accelerator block of the reprogrammable accelerator to execute the other complex instruction comprises providing, to the accelerator complex, the accelerator image not deployed to the accelerator complex.

12. The apparatus of claim 11, wherein the steps further comprise determining to configure, based on the accelerator image not deployed to the accelerator complex, the accelerator block based on one or more of: a number of available accelerator blocks, a frequency of accelerator block access, a verification of the accelerator image not deployed to the accelerator complex, or an estimated speedup.

13. The apparatus of claim 8, further comprising verifying the synthesized accelerator image including comparing results of executing the potentially accelerable instruction sequence by the processor core with an output of the synthesized accelerator image.

14. The apparatus of claim 13, wherein the steps further comprise storing the synthesized accelerator image in a Complex Instruction Library comprising one or more entries each associating one of a plurality of complex instructions with a corresponding accelerator image.

15. A computer program product for hardware acceleration using a self-programmable coprocessor architecture, the computer program product disposed upon a non-transitory computer readable storage medium, the computer program product comprising computer program instructions that, when executed, cause a computer to carry out the steps of:

determining that an instruction cache comprises either an accelerable instruction sequence or a potentially accelerable instruction sequence;

responsive to determining that the instruction cache comprises an accelerable instruction sequence:

instead of executing, by a processor core, the accelerable instruction sequence, providing, to an accelerator block of an accelerator complex comprising a plurality of accelerator blocks, a complex instruction corresponding to the accelerable instruction sequence, wherein the accelerator block comprises one or more reprogrammable logic elements configured to execute the complex instruction; and receiving, from the accelerator complex, a result of the complex instruction;

responsive to determining that the instruction cache comprises the potentially accelerable instruction sequence:

determining that another complex instruction for the potentially accelerable instruction sequence does not correspond to any accelerator image;

synthesizing, based on the potentially accelerable instruction sequence, a accelerator image in parallel to executing, by the processor core, the potentially accelerable instruction sequence; and verifying the synthesized accelerator image.

16. The computer program product of claim 15, wherein determining that the instruction cache comprises an accelerable instruction sequence comprises determining that a value stored in a Multiple Input Signature Register (MISR) corresponds to the complex instruction, wherein the MISR is configured to receive, as input, a plurality of instructions from the instruction cache.

17. The computer program product of claim 16, wherein the steps further comprise:

determining that the instruction cache comprises the potentially accelerable instruction sequence;

determining that the other complex instruction for the potentially accelerable instruction sequence corresponds to an accelerator image not deployed to the accelerator complex; and configuring, based on the accelerator image not deployed to the accelerator complex, the accelerator block of the reprogrammable accelerator to execute the other complex instruction.

18. The computer program product of claim 17, wherein configuring, based on the accelerator image not deployed to the accelerator complex, the accelerator block of the reprogrammable accelerator to execute the other complex instruction comprises providing, to the accelerator complex, the accelerator image not deployed to the accelerator complex.

19. The computer program product of claim 18, wherein the steps further comprise determining to configure, based on the accelerator image not deployed to the accelerator complex, the accelerator block based on one or more of: a number of available accelerator blocks, a frequency of accelerator block access, a verification of the accelerator image not deployed to the accelerator complex, or an estimated speedup.

20. The computer program product of claim 15, wherein verifying the synthesized accelerator image includes comparing results of executing the potentially accelerable instruction sequence by the processor core with an output of the synthesized accelerator image.

\* \* \* \* \*